United States Patent [19]

Riddle, Jr.

[11] 4,389,636
[45] Jun. 21, 1983

[54] ENCODING/DECODING SYNCRONIZATION TECHNIQUE

[76] Inventor: Herbert S. Riddle, Jr., 403 W. Frier Dr., Phoenix, Ariz. 85021

[21] Appl. No.: 203,475

[22] Filed: Nov. 3, 1980

[51] Int. Cl.³ .............................................. H04L 3/00
[52] U.S. Cl. .............................. 340/347 DD; 371/47
[58] Field of Search ................. 340/347 DD; 360/42; 375/87, 116, 110; 371/70, 55, 47

[56] References Cited

U.S. PATENT DOCUMENTS

| | | | |
|---|---|---|---|
| 3,403,377 | 9/1968 | Connolly | 371/47 |
| 3,493,679 | 2/1970 | Chomicki | 375/87 |
| 3,652,988 | 3/1972 | Yamamoto | 340/146.1 AB |
| 3,961,203 | 6/1976 | Hutch | 307/236 |
| 4,045,771 | 8/1977 | Loreck | 371/70 |
| 4,070,648 | 1/1978 | Mergenthaler | 340/146.1 BE |
| 4,146,743 | 3/1979 | Raynham | 375/110 |
| 4,223,326 | 9/1980 | D'Amato | 371/49 |
| 4,241,398 | 12/1980 | Carll | 375/87 |

Primary Examiner—C. D. Miller
Attorney, Agent, or Firm—Bruce D. Sunstein

[57] ABSTRACT

A non-binary digital encoding/decoding process wherein the serial bits to be transferred are encoded into a stream of complementary-bit-pairs, a predetermined bit of each pair corresponding to an original information bit, and the other bit of the pair being the complement of that bit. This stream of encoded complementary-bit-pairs is transferred, as by a communication or information-storage medium, to a decoder where the encoded stream is fed to and along a shift register. The bit-pairs in the decoder register are continuously examined for complementary relationship as the encoded stream is shifted along the register. The resulting signal generated in the decoder enables transferral of only error-free serial information out of the register, due to the error-detection properties inherent to the encoding/decoding process. Because each bit is encoded as a complementary-bit-pair, the coding technique is non-binary in nature and could therefore be called a quaternary rate-one-half non-convolutional error-erasure-transformation coding process.

13 Claims, 3 Drawing Figures

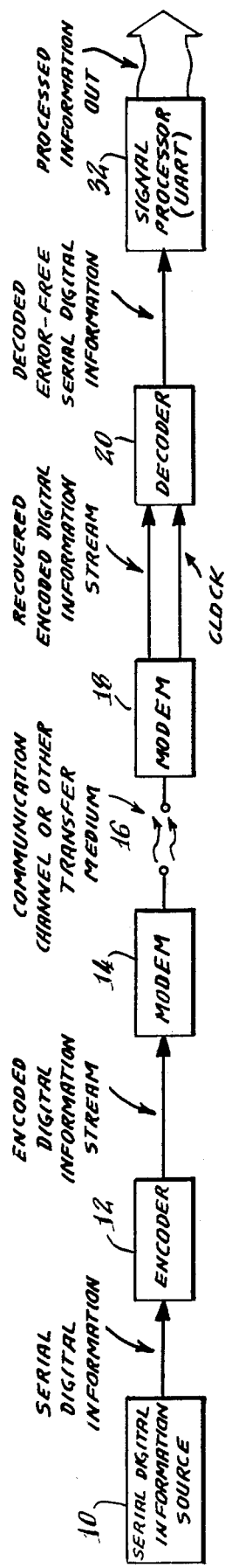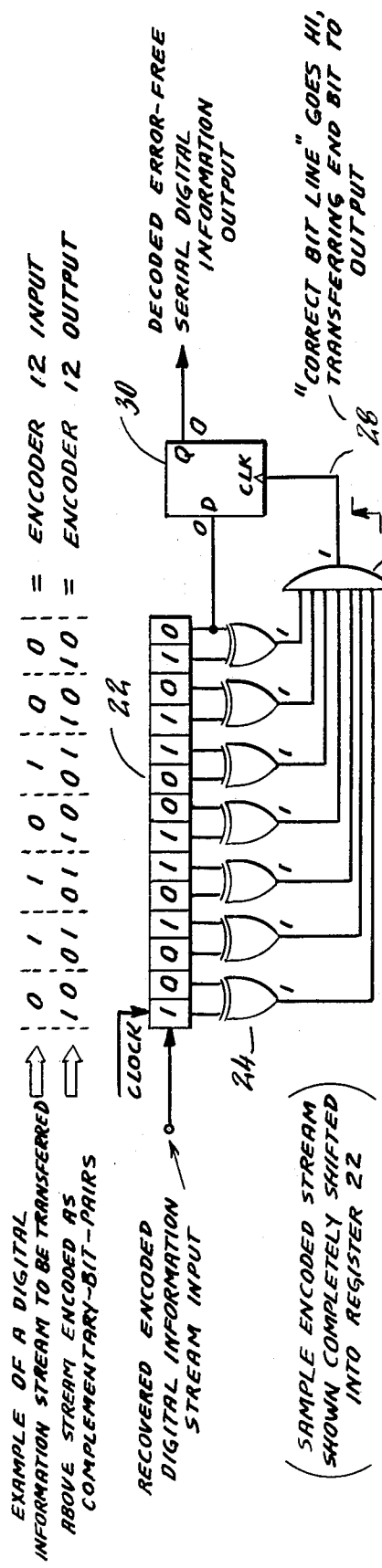

ENCODING/DECODING SYNCRONIZATION TECHNIQUE

BACKGROUND OF THE INVENTION

This invention relates to digital data-transfer systems wherein the data is encoded before transfer and then decoded in a manner facilitating error-detection. More particularly, this invention relates to methods and apparatus for encoding and decoding digital data to provide for transferring serial data substantially error-free.

Much effort has been devoted to coding serial digital data in various ways to perform detection and/or correction of the unavoidable errors encountered during data transfer. Prior art coding schemes intend to make the transmitted data less susceptible to errors, through the us of cyclic block-coding, convolutional coding, Hamming, BCH, CRC, Fire, Golay, Reed-Solomon and other complex coding techniques, as is well known in the art. The simplest and most widely-used error detection method is the "parity bit" technique, which appends an additional bit to, say, every 7-bit word, in order to make the number of 1's in the completed 8-bit word even (or odd, as the case may be). Such coding methods, however, although providing useful results in many applications, can be quite deficient in many respects. For example, the single-parity-bit scheme is not capable of detecting words containing an even number of errors. Such errors are common in many data transfer systems. The more complex cyclic and convolutional codes, while providing some error-correction capability, can fail catastrophically if the number of errors exceeds some small value determined by the mathematical properties of the particular code. In such a case, the decoder can unknowingly output a totally erroneous character while assuming that it has instead merely corrected several errors in the received word. Noise which causes the number of errors in a received character to exceed the maximum number which the code can detect is called "catastrophic" noise, due to the inability of the decoding process to know that its maximum number of correctable or detectable errors has been exceeded (see "The Technology of Error-Correcting Codes", E. R. Berlekamp, Proceedings of the IEEE; May, 1980).

One particularly serious problem in many systems is therefore presented by what is called burst noise. Generally, the effect of burst noise on analog systems is to force contiguous strings of 1's (or 0's), often of considerable and unpredictable length, into the recovered encoded stream. This is often the case regardless of the particular analog modulation technique used to transfer the encoded data, such as AM, FM, FSK, PSK, Manchester, Biphase, and other well-known modulation methods. Both high-amplitude noise and/or sudden signal loss can cause clipping, saturation, and other non-linear limiting effects in sensitive analog receives. An ideal error-detection system would have high sensitivity to such perturbations, and would be so sensitive sio as to be able to detect forced strings of 1's (or 0's) of any length, from single-bit errors (a "string" of length 1) to long strings resulting from channel failure (a string of essentially infinite length). Such an optimum error-detecting encoding/decoding process is the subject of this invention.

SUMMARY OF THE INVENTION

It is an object of this invention therefore to provide an improved encoding/decoding process capable of extremely low probability-of-error in the recovered decoded information, regardless of the magnitude or duration of the error-inducing noise encountered during transfer. Another object of this invention is to provide such an encoding/decoding process which can be embodied in apparatus simple in construction, reliable in operation, and which is capable of operation at very high speeds due to the fact that no complex computation is required in the decoding process.

In carrying out this invention in one illustrative embodiment thereof, serial information bits are applied to an encoder wherein each bit is converted to a complementary pair of bits in which a predetermined one of the pair corresponds to the original information bit, and the other bit of the pair is the complement of that bit. These complementary-bit-pairs are transferred to a decoder where they are shifted into and along a shift register. A set of Exclusive-OR gates is coupled to the register stages to compare the bits in adjacent pairs of the shift register's stages. When all pairs of adjacent stages are found to contain complementary bits, the encoded information in the register can be assumed to have been received error-free, and the end bit in the decoder register thereupon is transferred from the register to the signal-processing portion of the receiver. These error-free decoded bits can then be grouped if necessary into their corresponding characters. Such signal processors are often called UARTs, for Universal Asynchronous Receiver Transmitter, and are well known in the art.

The adjacent-pair-analysis procedure is performed continuously as the recovered stream of encoded information is shifted along the register. If a non-complementary information-bit-pair enters the decoder register, it is indicative of an error having occurred during transfer, and it will be shown that transferral of the erroneous information out of the register is then automatically inhibited.

Other objects, aspects and advantages of the invention will in part be pointed out in, and in part apparent from, the following description considered together with the accompanying drawings.

BRIEF DESCRIPTION OF THE DRAWINGS

FIG. 1 is a block diagram of a system in accordance with this invention, arranged in the general format of a typical serial-data-transfer system, wherein the original digital information is first encoded, sent via a modem over a communication channel, received by another modem, and then sent to a digital decoder, which attempts to correctly decode the incoming stream and output only the correct original information.

FIG. 2 is a schematic diagram in accordance with the present invention showing the basic internal circuitry of a decoder to serve the function of block 20 of FIG. 1. A sample encoded stream is shown shifted completely into the decoder's shift register, without any error(s). Because all adjacent pairs are complementary, all the Ex-OR gate outputs are high, thereby shifting out the end bit in the register.

FIG. 3 shows the shift register of FIG. 2 with all the bit-pairs shifted forward one bit, as would automatically occur with the reception of the next incoming bit, denoted as N. Because the register is at least as long as twice the maximum possible number of contiguous 1's (or 0's) which can be encoded, at least one Ex-OR gate is guaranteed to see a non-complementary (i.e. identical) pair in this "out-of-phase" position. This forces the output 28 of AND gate 26 low, thereby automatically inhibiting output of the trailing complementary bit in the bit-pair representing the encoded 0 information bit in the sample stream shown.

DESCRIPTION OF A PREFERRED EMBODIMENT

Referring now to FIG. 1, the disclosed encoding/decoding apparatus includes a serial digital information source 10, the output of which is applied to an encoder 12. As previously described, the encoder 12 encodes each bit fed thereto into a complementary pair of bits wherein a predetermined bit of the pair (e.g. the first bit) corresponds identically to the original information bit, and the other bit of the pair is the complement of that bit. For example, if the information to be transferred are the 7 bits 0110100, then the encoder 12 will output the 14-bit encoded stream 10010110011010, as shown in FIG. 2, at twice the input bit-rate. The particular 7-bit example given is simply illustrative, and it will be understood that the original bits can be in any form, e.g. grouped in word format, or combined with control signals, etc., or recorded onto (and later recovered from) a storage medium, as required for any given application.

Referring to FIG. 2, it will be noted that the bit in the right-hand position of each complementary-bit-pair is identical to the corresponding original information bit from the serial source 10, while the left-hand bit of each such encoded bit-pair is the complement of its corresponding bit. It will be understood, however, that the reverse arrangement can be used, wherein the original information bit appears in the left-hand position of the complementary-bit-pair, and its complement in the right-hand position. In either case, the encoder 12 is quite simple in construction, for example requiring only a single Ex-OR gate receiving the information on one input, and having a clock signal on the other input at twice the information rate. The construction of such an encoder would be easily understood and could be easily implemented in hardware or software by anyone versed in the art, so that further discussion of the encoder 12 is not necessary.

The encoded bit stream of contiguous complementary-bit-pairs developed by encoder 12 is directed to a transmitter 14 including for example the usual conventional carrier modulator (i.e. a "modem", of MOdulator-DEModulator, as are well known), together with means for developing an output analog signal suitable for sending over a transmission channel 16, e.g. as by RF transmission, microwave transmission, transmission over power lines, storage onto a magnetic medium, and so forth. Receiver modem 18 is shown demodulating the incoming analog signal from said transmission or storage medium and developing an encoded stream of bits corresponding to the complementary-bit-pairs generated by encoder 12. This encoded stream of bits is directed to a decoder 20 which is driven by clock pulses from receiver modem 18. These pulses are generated by the analog receiver modem 18 and are synchronized with the incoming encoded stream, in known fashion. The decoder 20 is driven by these clock pulses, and as will be explained functions to pass only error-free (decoded) information.

The stream of encoded bits from receiver modem 18 is applied to the input of a shift register 22, as shown in FIG. 2, where the bits are clocked into and along the register by the clock pulses from receiver modem 18. FIG. 2 shows the register in decoder 20 with the aforementioned sample 14-bit encoded stream completely shifted in with no errors present. The bits in the individual stages of the register are continuously monitored by a set of Exclusive-OR gates 24 as shown. Each such gate is coupled to a pair of adjacent register stages to determine whether or not the corresponding pair of bits in those two adjacent stages is at that moment complementary. (Only when the two inputs of an Ex-OR gate are different will the output be a logical 1.)

The outputs of all of the Ex-OR gates 24 are connected to an AND gate 26 having an output 28. If all the adjacent pairs of register stages being analyzed by the Exclusive-OR circuitry contain complementary bits (i.e. either 01 or 10, as shown in FIG. 2), the AND'ed output line 28 of the Exclusive-OR gates is high. When this output line 28 goes high, this indicates that the contents of the register consists entirely of complementary adjacent bit-pairs. Thus line 28 is referred to as the "Correct Bit Line". A low-to-high transition on this line controls circuit 30, which in the preferred embodiment is a D-type leading-edge-triggered flip-flop, a simple logic circuit which transfers its input bit to its output line at the moment that its clock line goes high. That is, when line 28 goes high, circuit 30 transfers the information bit in the last register stage to the usual signal-processing portion 32 of the receiver, such as a UART, which are well known. The signal processing includes, for example, checking for format and parity, etc., and framing the bits into predetermined words if required.

FIG. 3 shows the register 22 with a new incoming bit "N" shifted into its first stage, and all the remaining bits correspondingly moved along one stage. Now at least one Ex-OR gate sees a non-complementary pair (at least four, in this particular example), and the Correct Bit Line 28 thus goes low. This however does not represent an error, in the example given, because the bit now in the last stage of the register is not one of the original information bits, but is instead the complement of the previously outputted bit. This decoding register 22, therefore, is automatically bit-self-synchronizing in that it automatically discards the trailing complementary bit in each encoded bit-pair. On the next register shift, if the two new bits shifted into the register are complementary, then line 28 will again go high, transferring the next information bit out of the register.

Therefore, as the stream of incoming encoded bits is shifted along register 22, they are analyzed in a continuing procedure wherein pairs of adjacent bits are compared for complementary relationship. In normal operation, that is, when no errors have been introduced into the received encoded stream, this step-by-step shifting with continuous corresponding analysis of adjacent bit pairs causes the Correct Bit Line 28 to alternate between 1 (when the complementary-bit-pairs are in phase with the Ex-OR's 24) and 0 (on every other shift when the pairs are out-of-phase).

This line is guaranteed to go to a 0 at each out-of-phase position as long as the shift register length is at least twice the maximum possible number of contiguous 1's (or 0's) permissible in the actual non-encoded information, as determined by the usual controls included in the serial source 10. As long as there is an encoded 1 next to an encoded 0 in the register (i.e. a 1001 or a 0110 in the register, equivalent to the information bits 01 or 10, respectively), then at least one Ex-OR gate is guaranteed to be looking at either 11 or 00 at every other bit-shift when the bit-pairs are out-of-phase with the Ex-OR gates, thereby forcing the Correct Bit Line to go low at the appropriate alternating out-of-phase shift positions. Although it is difficult to visualize or graphically or mathematically depict the error-detection capability of this decoding process, it will become apparent after studying FIG. 2 that if any single bit in the encoded stream is erroneous, information transfer out of the register is immediately and automatically inhibited until the error (or errors) is (are) propagated along and out of the register. This will also be seen to be true for any number of contiguous (1's (or 0's) which might be forced into the encoded bit stream by noise in the transmission channel. Because of this unique error-detection capability, failure of the Correct Bit Line to go to a logical 1 exactly one-bit-time after it has gone to a logical 0 provides virtually immediate indication of a bit error in real time. An error signal can easily be developed to reflect this condition, such as by means of a retriggerable-one-shot circuit set to a value appropriate for the known transmission rate, and continuously retriggered by the rising edge of the Correct Bit Line.

This error signal can be utilized to effect any one or more of several control actions. For example: (1) A signal can be sent back to the transmitter to direct the transmitter to repeat the transmission, starting at some predetermined earlier part of the message; (2) The output line 30 can be forced to a logical 1 while the error (or errors) is (are) being propagated along and out of the register, to give the asynchronous digital receiver following the decoder, shown as signal processor 32 in FIG. 1, an opportunity to "time out" its own clock in preparation for receiving the standard leading-zero "start" bit in a retransmitted word; or (3) The remaining known-good bits in register 22 can be serially shifted out for further processing, for example to complete a word which had only been partially shifted out of the decoder prior to detection of an incoming error.

It may be noted that the above-described shift-register/Ex-OR arrangement functions in effect as a transversal digital filter, which literally filters the incoming encoded serial bit stream, and outputs only the original serial information bits inputted to encoder 12. It can be further seen that this decoder automatically synchronizes itself to the information bits in the incoming encoded bit stream and automatically filters out the trailing bit in each encoded bit-pair, and that its operation is virtually independent of the speed of the incoming encoded stream.

A characteristic of the disclosed encoding/decoding technique is that it produces an encoded stream which has very high sensitivity to any error(s) which might be introduced during transfer through transmission channel 16. The more fragile the transmitted bit stream, in the sense of sensitivity to introduced error(s), the greater is the probability that small as well as large errors will be detected. Thus, as discussed above, any noise burst which forces contiguous 1's (or 0's) into the transmitted stream can not cause an output error. Moreover, any single bit error in the recovered encoded stream will be seen to be automatically blocked, regardless of whether the erroneous bit is either an information bit or its corresponding complementary bit.

It will become apparent that the dynamics of the actual transmitted code also assures that the channel remains "unsaturated", since it is impossible to transmit more than two adjacent 1's or 0's. Also, regardless of the character sent, the number of 1's always equals the number of 0's, giving all characters the exact same code weight and same 1-to-0 ratio of 50%. This is an advantageous characteristic for many types of analog demodulators, and will be especially significant to the field of magnetic recording, where preventing saturation of the magnetic medium is of paramount importance. Because of the fundamental nature of this invention, the circuitry required for its construction is very basic and widely known. It will suffice therefore, rather than to complicate the figures, to state that a functioning prototype of this invention was easily constructed with inexpensive and widely available logic circuitry; the decoder register 22 was constructed with 74LS374 octal flip-flops, the Ex-OR gates 24 were 74LS86 Quad-Ex-OR$^s$, and flip-flop 30 was one-half of a 74LS74 dual leading-edge-triggered-flip-flop package.

As mentioned previously, the length of the shift register 30 must only be equal to or greater than twice the maximum permissible number of contiguous 1's or 0's that can be outputted by the serial source 10, in order to prevent a possible momentary loss of the automatic bit-self-synchronization. For example, if this number were predeterminedly limited to 7 contiguous 1's or 0's, shift register 22 must have a length of at least 14 stages in order to contain 7 encoded information bits.

The disclosed system is therefore capable of virtually error-free operation even in the presence of burst noise of any duration or bit length. It is optimized for error detection, as distinct from error correction. If it is desired, when information is lost due to burst noise, the receiver can request retransmission of the erased information (if possible), a technique which is well known. Thus the effect of burst noise would only be to reduce the data through-put rate, without impairing accuracy. Since burst noise is a relatively rare phenomenon, the net reduction in through-put rate would normally be slight. As information is often transmitted as characters, with a parity bit, noise bursts which could perform a double-adjacent-inversion of an information-bit-pair (i.e. change a 10 to a 01) would result in a single (decoded) bit error which could, however, be detected in signal processor 32 (since a simple parity check is guaranteed to detect single bit errors). Therefore, for the signal processor 32 to fail detection of an erroneous character would require that noise bursts perform a double double-adjacent-information-bit-pair-inversion, in order to create the 2 (decoded) bit errors necessary to fail parity detection in processor 32. The statistical probability of such an event, however, is extremely small, as can be demonstrated mathematically using the well-known Poisson distribution function. Thus this coding technique can provide non-detectable-bit-error probabilities of many orders of magnitude below one-part-per-billion in actual systems. As previously shown, any burst noise which introduces a contiguous string of 1's (or 0's) of any length, from 1 to infinity, is guaranteed detectable, giving a non-detectable-bit-error rate of zero for such noise. In real systems, such noise is very likely. It will likewise be apparent that this coding process is also effective against Gaussian (random) noise, as the probability of random Gaussian noise bursts accidentally producing a complete full-length word, composed entirely of properly-encoded complementary-bit-pairs, is very small.

It should be stressed that the actual information is not contained in either one of the 2 bits of a particular pair, but is instead contained in the ordering (sequence) of the 2 bits comprising each complementary-encoded pair. The fact that one bit of each pair does indeed have a one-to-one correspondence with the corresponding information bit is but an inherent property of this process which facilitates exceptionally fast decoding. But precisely because the information is contained in the ordering of the complementary bits in each pair, the overall coding process has the unique property of automatically transforming errors in the recovered encoded stream into erasures in the decoded information (an error in the theoretical sense being a known-erroneous bit in an unknown position, whereas an erasure is an unknown bit in a known position). The transformation of errors into erasures, which this coding technique provides, has profound implications with regard to the field of Information Theory. Fundamental coding theory dictates that any code with minimum (Hamming) distance d between codewords is limited to correcting no more than $(d-1/2)$ errors (or $(d-2/2)$ if d is even), and can detect at most $d-1$ errors (if none are simultaneously corrected). As discussed previously, if the number of errors exceeds $d-1$, the code and decoder fail catastrophically. One of the fundamental tenets of coding theory is the equivalency of 1 error to exactly 2 erasures. Therefore, if only erasures were present, any code capable of correcting $(d-1/2)$ errors could detect and correct twice as many, namely $d-1$, erasures. Thus a hypothetical coding technique which could effectively transform errors to erasures could double the error-correcting capability of another code (see "Error-Correcting Codes", Peterson and Weldon, 2nd Edition, MIT Press, Cambridge, MA 1978: pgs. 8, 9 (binary-erasure channel); pg. 121 (Optimum Codes for the Binary Symmetric Channel); pg. 124 (Tablet of Largest Known Values of k for Given Values of n and d); pg. 305 (Correction of Erasures and Errors); pg. 370 (Multiple-Burst Correction)). If the technique could also effectively detect more than $d-1$ errors (by both guaranteeing that essentially no errors are present and by having the ability to detect virtually any number of erasures, even when the number is much greater than d), then such a code could eliminate the innate catastrophic decoding failures which are at present unavoidable with essentially all minimum-distance-decoding techniques (see "The Theory of Information and Coding—A Mathematical Framework for Communications", R. J. McEliece, Addison-Wesley Publishing Company, Reading, MA 1977: pg. 157, 7.17a; pg. 233, 9.19). As has been demonstrated, all of the above desired properties of the hypothetical code in question are inherent to this invention. It will likewise be apparent that the coding process of this invention could be applied advantageously to other coding techniques. Combination with sophisticated error-correcting codes (such as Reed-Solomon codes) could create new codes with virtually unlimited error-detection abilities, increased error-correction capabilities, and with a concurrent complete immunity from the ever-present threat of catastrophic decoding failure.

Although the presently preferred embodiment of the invention has been set forth hereinabove in detail, it is to be understood that this is to illustrate the principles of the invention, and should not be considered as limiting of the invention since it is apparent that many modifications to the disclosed arrangements can be made while still making use of basic concepts of the invention as set forth in the claims. For example, although the decoding apparatus 20 can very conveniently be provided in hardware format, as by the shift register described above, the process could in appropriate circumstances be performed under software control. Still other modifications will be evident to those skilled in the art. Thus it is apparent that the basic circuitry could easily be implemented into a single digital integrated circuit which contains a shift register of appropriate length and the necessary Exclusive-OR gates and associated circuitry, thus obviating the need for the plurality of individual integrated circuits mentioned above that were required to build a working prototype of this invention.

I claim:

1. An encoding/decoding process for transferring serial digital bits, comprising the steps of:
   encoding each bit as a corresponding complementary-bit-pair wherein a predetermined one of the pair corresponds to the original bit and the other is the complement of that bit;
   transferring this encoded stream of complementary-bit-pairs to a decoder;
   analyzing in said decoder simultaneously a pluralility of adjacent pairs of said encoded stream to determine whether a complementary relationship exists between the adjacent bits of all such pairs; and
   directing a predetermined bit of one of said sequential pairs to an output line when all of said currently analyzed adjacent pairs of said encoded stream are determined to have a complementary relationship.

2. The process of claim 1, wherein said stream of complementary-bit-pairs is analyzed in a repetitive procedure where in each step of said procedure all bits in adjacent bit-pairs are examined for complementary relationship.

3. The process of claim 1, wherein as part of the analysis procedure said encoded stream of complementary-bit-pairs is directed to the input of a shift register and shifted therealong;
   said adjacent pairs of bits being analyzed for complementary relationship in said shift register.

4. The process of claim 3, wherein the bits in all pairs of adjacent stages are analyzed by respective Exclusive-OR gates.

5. The process of claim 1, wherein the maximum possible number of contiguous 1's (or 0's) in the bits to be encoded is limited to a predetermined amount,
   the step of analyzing in said decoder including the step of analyzing simultaneously a number of adjacent bit-pairs which is equal to or greater than said predetermined amount.

6. Apparatus for encoding and decoding serial digital data, comprising:
   a serial digital information source;
   encoder means coupled to said source for converting these bits into an encoded stream wherein each original bit from said source is encoded as a complementary-bit-pair in which a predetermined one of the pair corresponds to the original information bit and the other bit of the pair is the complement of that original bit;
   transfer means for directing said encoded bit stream to a decoder;
   said decoder including means to analyze simultaneously a plurality of adjacent bit-pairs to develop an output information bit from said encoded bit stream when all said currently analyzed bit-pairs are determined to be complementary.

7. Apparatus as set forth in claim 6, wherein said decoder means includes storage means to receive said complementary-bit-pairs;
a digital filter comprising means for comparing the individual bits in adjacent pairs in said storage means; and
means responsive to said comparing means for generating a transfer signal when all bit-pairs being compared are complementary.

8. Apparatus as set forth in claim 7, wherein said storage means comprises a shift register; and
said digital filter comprising means coupled to pairs of adjacent stages of said shift register for determining whether a complementary relationship exists between the bits stored respectively in said pairs of adjacent stages.

9. Apparatus as set forth in claim 8, wherein said digital filter comprises an Exclusive-OR circuit for each pair of adjacent stages and arranged to produce said transfer signal when all of said Exclusive-OR circuits develops a signal indicating a complementary relationship.

10. Apparatus as set forth in claim 6, wherein said digital information source limits the maximum possible number of contiguous 1's (or 0's) to a predetermined number;
said decoder means including means for simultaneously analyzing a number of adjacent bit-pairs which is equal to or greater than said predetermined number.

11. Apparatus as set forth in claim 10, wherein said bit-pairs are analyzed by means comprising a shift register along which the encoded bit-pairs are shifted;
said shift register having a number of stages which is at least twice said predetermined number.

12. An error erasing decoding device for simultaneously decoding and erasing noise from a stream of binary information encoded so that each bit of information is in the stream as part of a bit pair including the complement of such bit, the device comprising:
means for analyzing simultaneously a plurality of adjacent bit-pairs in the stream and for producing an output when all the currently analyzed bit-pairs are determined to be complementary.

13. A device according to claim 12, for decoding and erasing noise from an encoded stream of binary information which before encoding had less than a predetermined number of contiguous 1's (or 0's), wherein the analyzing means includes means for analyzing simultaneously at least the predetermined number of bit-pairs.

* * * * *